R. E. EBBS.
AUTOMOBILE TIRE.
APPLICATION FILED SEPT. 30, 1918.

1,297,550.

Patented Mar. 18, 1919.

Witness

Inventor
R. E. Ebbs
By C. A. Snow & Co.
Attorneys.

UNITED STATES PATENT OFFICE.

ROBERT E. EBBS, OF HUTTIG, ARKANSAS.

AUTOMOBILE-TIRE.

1,297,550.  Specification of Letters Patent.  Patented Mar. 18, 1919.

Application filed September 30, 1918. Serial No. 256,261.

*To all whom it may concern:*

Be it known that I, ROBERT E. EBBS, a citizen of the United States, residing at Huttig, in the county of Union and State of Arkansas, have invented a new and useful Automobile-Tire, of which the following is a specification.

It is the object of this invention to provide a tire which will be devoid of pneumatic elements subject to puncture and deterioration.

Another object of the invention is to provide novel means for assembling with the constituent members of a resilient tread, and with the felly, casings wherein sustaining springs are located.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
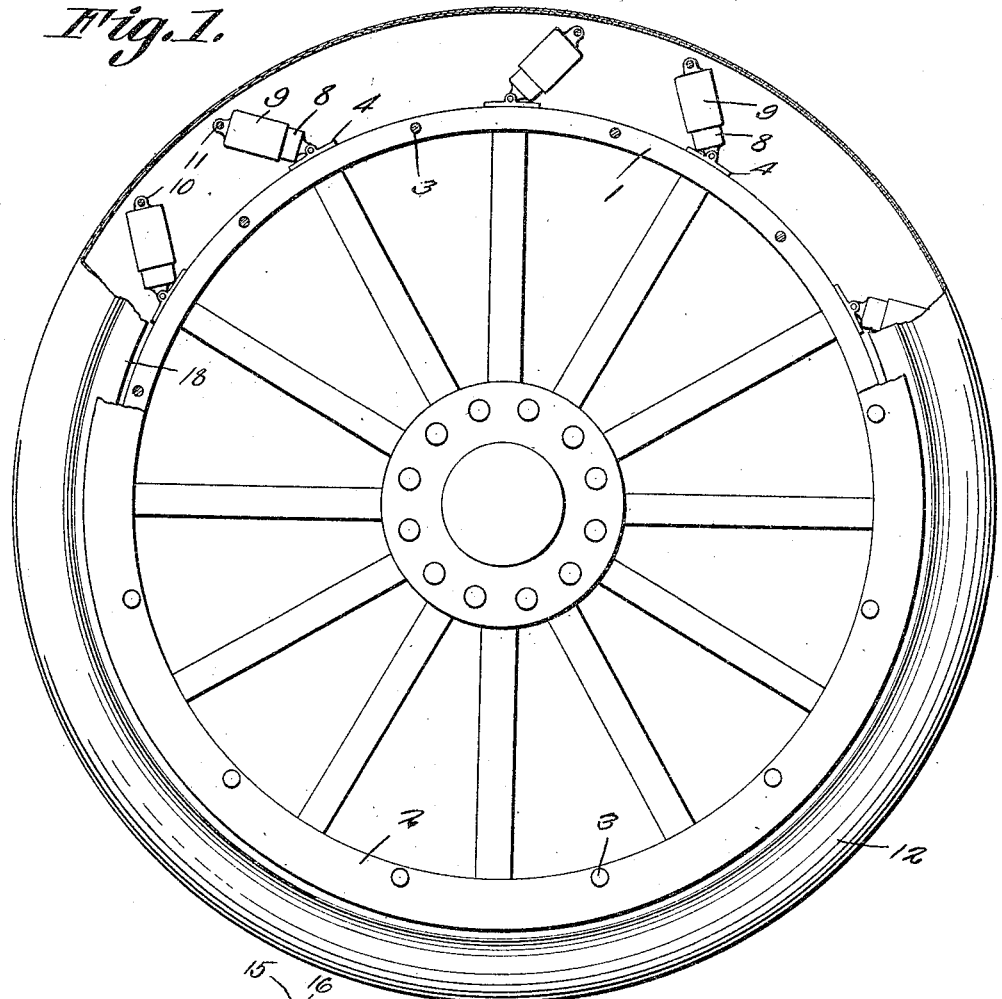
Figure 2:
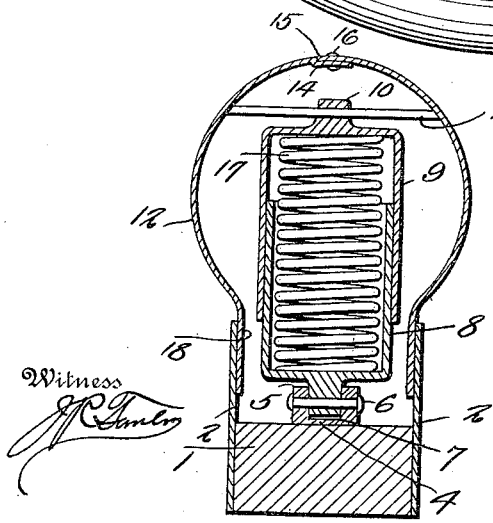

Figure 1 shows in side elevation, a wheel equipped with a device constructed in accordance with the invention, parts being broken away; Fig. 2 is a transverse section taken through the tire and the felly.

The numeral 1 marks a felly wherewith side plates 2 are assembled by means of securing devices 3. Foot plates 4 are connected to the felly 1 and have ears 5 carrying pivot elements 6 receiving lugs 7 located betwen the ears 5, the lugs 7 being disposed on the inner ends of tubular members 8 slidable within tubular members 9 having lugs 10 on their outer ends, the lugs 10 being mounted on cross pins 11 connecting the oppositely bowed parts 12 of a resilient metal tread. One of the parts 12 of the tread is offset as shown at 14, in its outer portion, to receive the edge 15 of the other part of the tread, the elements 14 and 15 being connected by securing devices 16 which may be rivets. Compression springs 17 are disposed within the tubular members 8 and 9 and abut against the ends thereof. The members or parts 12 of the tread are provided with flanges 18 slidably received between the side plates 2 of the felly 1.

The tubular members 8 and 9 form casings which are disposed in pairs, the casings of each pair being inclined toward each other, circumferentially of the felly 1, as clearly shown in Fig. 1. Owing to this disposition of the casings, the tread will be held securely but yieldably on the felly 1, it being obvious that the springs 17 will compress and afford the necessary resiliency. The cross pins 11 exercise a double function, in that they constitute a means for holding together, the parts 12 of the resilient tread, and constitute, also, a place of pivotal attachment for the outer ends of the casings.

Having thus described the invention, what is claimed is:—

In a device of the class described, a felly having side plates; a resilient tread comprising separable parts having flanges received slidably between the side plates; transverse rods uniting the parts of the tread; casings disposed in pairs, the casings of each pair being inclined toward each other circumferentially of the felly, each casing including telescoped inner and outer tubular members, the outer tubular members being pivotally supported on the rods; means for pivotally connecting the inner members of the casings with the felly; and springs within the casings, the ends of the springs abutting against the inner and outer tubular members.

In testimony that I claim the foregoing as my own, I have hereto affixed my signature in the presence of two witnesses.

ROBERT E. EBBS.

Witnesses:
J. B. CROCKETT,
G. W. GRAY.

Copies of this patent may be obtained for five cents each, by addressing the "Commissioner of Patents, Washington, D. C."